United States Patent
Ishii et al.

(10) Patent No.: US 11,194,718 B2
(45) Date of Patent: Dec. 7, 2021

(54) INSTRUCTION CACHE COHERENCE

(71) Applicant: Arm Limited, Cambridge (GB)

(72) Inventors: Yasuo Ishii, Austin, TX (US); Matthew Andrew Rafacz, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/520,657

(22) Filed: Jul. 24, 2019

(65) Prior Publication Data
US 2021/0026770 A1    Jan. 28, 2021

(51) Int. Cl.
| | | |
|---|---|---|
| *G06F 12/08* | (2016.01) | |
| *G06F 12/0815* | (2016.01) | |
| *G06F 12/0875* | (2016.01) | |
| *G06F 12/0808* | (2016.01) | |
| *G06F 9/38* | (2018.01) | |
| *G06F 12/1018* | (2016.01) | |

(52) U.S. Cl.
CPC ........ *G06F 12/0815* (2013.01); *G06F 9/3802* (2013.01); *G06F 12/0808* (2013.01); *G06F 12/0875* (2013.01); *G06F 12/1018* (2013.01); *G06F 2212/452* (2013.01); *G06F 2212/657* (2013.01)

(58) Field of Classification Search
USPC ......... 711/141–146, 202–209, 125, 200–221
See application file for complete search history.

(56) References Cited

U.S. PATENT DOCUMENTS

| | | | |
|---|---|---|---|
| 2008/0104362 A1* | 5/2008 | Buros | G06F 12/1054 711/207 |
| 2019/0155733 A1* | 5/2019 | Hagersten | G06F 12/0811 |
| 2019/0227934 A1* | 7/2019 | Li | G06F 12/109 |
| 2020/0004541 A1* | 1/2020 | Sankaranarayanan | G06F 9/3802 |

* cited by examiner

*Primary Examiner* — Ilwoo Park
(74) *Attorney, Agent, or Firm* — Nixon & Vanderhye P.C.

(57) ABSTRACT

A data processing apparatus is provided, which includes a cache to store operations produced by decoding instructions fetched from memory. The cache is indexed by virtual addresses of the instructions in the memory. Receiving circuitry receives an incoming invalidation request that references a physical address in the memory. Invalidation circuitry invalidates entries in the cache where the virtual address corresponds with the physical address. Coherency is thereby achieved when using a cache that is indexed using virtual addresses.

14 Claims, 6 Drawing Sheets

INSTRUCTION CACHE COHERENCE

TECHNICAL FIELD

The present disclosure relates to data processing. More particularly, it relates to instruction caches.

DESCRIPTION

In a data processing apparatus, instructions to be executed are fetched from storage and then decoded to produce one or more operations. The process of decoding can be sped up (or even circumvented) by caching the operations. It would be desirable for such a cache to be indexed by a virtual address rather than a physical address because this saves the need to perform conversion between virtual and physical addresses. However, invalidation requests, which are used to invalidate locally cached copies of instructions or operations relating to those instructions, index entries using physical addresses. Such invalidation requests tend not to use virtual addresses since multiple virtual addresses could refer to the same physical address. Therefore by only invalidating one virtual address, it is possible that other copies of the same instruction (provided at other virtual addresses) would not be invalidated.

SUMMARY

Viewed from a first example configuration, there is provided a data processing apparatus comprising: a cache to store operations produced by decoding instructions fetched from memory, wherein the cache is indexed by virtual addresses of the instructions in the memory; receiving circuitry to receive an incoming invalidation request, wherein the incoming invalidation request references a physical address in the memory; and invalidation circuitry to invalidate entries in the cache where the virtual address corresponds with the physical address.

Viewed from a second example configuration there is provided a data processing method comprising: decoding instructions fetched from memory to produce operations; storing the operations in a cache that is indexed by virtual addresses of the instructions; receiving an incoming invalidation request that references a physical address in the memory; and invalidating entries in the cache where a virtual address corresponds with the physical address.

Viewed from a third example configuration, there is provided a data processing apparatus comprising: means for decoding instructions fetched from memory to produce operations; means for storing the operations in a cache that is indexed by virtual addresses of the instructions; means for receiving an incoming invalidation request that references a physical address in the memory; and means for invalidating entries in the cache where a virtual address corresponds with the physical address.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided a data processing apparatus comprising: a cache to store operations produced by decoding instructions fetched from memory, wherein the cache is indexed by virtual addresses of the instructions in the memory; receiving circuitry to receive an incoming invalidation request, wherein the incoming invalidation request references a physical address in the memory; and invalidation circuitry to invalidate entries in the cache where the virtual address corresponds with the physical address.

The data processing apparatus receives invalidation requests for instructions whose operations may reside within the cache. The invalidation requests reference specific physical addresses in a physical domain in the memory. The invalidation circuitry invalidates entries in the cache having virtual addresses=that correspond with the physical addresses in the invalidation requests, thereby providing coherency while enabling the cache to be indexed using virtual addresses.

In some embodiments, the data processing apparatus comprises correspondence table storage circuitry to store indications of physical addresses of the instructions fetched from the memory. The correspondence table storage circuitry can be populated when instructions are passed to decoding circuitry, with the instructions either being directly fetched from memory or indirectly fetched from memory via an instruction cache. In some embodiments, the correspondence table storage circuitry acts as a fully-associative cache so that each entry of the correspondence table can be looked up simultaneously. In other embodiments, the correspondence table storage circuitry is set-associative so that only a particular entry can only be stored in a limited number of locations, thereby reducing the search time for a particular entry. By using the correspondence table in the correspondence table storage circuitry, it is possible to locate entries in the cache that correspond with the supplied physical address. Those entries can then be invalidated while leaving other entries alone. Consequently, by providing a correspondence table, invalidation can be achieved without simply invalidating all entries in the cache. In particular, there are at least some entries in the cache that are not invalidated in response to the incoming invalidation request. In some embodiments, those entries having virtual addresses that do not correspond with the supplied physical address are not invalidated. By inhibiting (or eliminating) undesired invalidation, any performance penalty that occurs as a result of simply invalidating the entire cache can be reduced.

In some embodiments, in response to the incoming invalidation request, the invalidation circuitry is adapted to determine a correspondence table index of the correspondence table storage circuitry that corresponds with the physical address referenced in the incoming invalidation request. The correspondence table can therefore store a list of physical addresses, each at a different index or position. Once the incoming invalidation request is received, a search is made in the correspondence table for an entry that corresponds with the physical address included within the incoming invalidation request. If such an entry is found, then an index of the correspondence table (the correspondence table index) at which the entry is found is returned. If no entry is found, then the instruction in question has not been fetched recently by the data processing apparatus and so no invalidation need be performed.

In some embodiments, the cache is adapted to store one of the operations in association with one of the correspondence table indexes of the correspondence table storage circuitry containing one of the indications of the physical addresses of one of the instructions that decodes to the one of the operations. In this manner, the correspondence table and the cache collectively relate an indication of a physical address to the corresponding operation that is generated from an instruction at that physical address.

In some embodiments, the indications of the physical addresses stored in the correspondence table storage circuitry comprise hashes of at least part of the physical addresses. Consequently, the indications of the physical addresses could be hashes of parts of physical addresses or hashes of the physical addresses. A hash function can be used to map an input domain to a smaller output domain. The amount of storage space needed for the correspondence table can therefore be reduced as compared to a situation in which (parts of) the physical addresses are stored. A consequence of this is that, since the output domain is smaller than the input domain, two physical addresses (or parts of physical addresses) may produce the same hash value. Therefore, when a physical address is received in an incoming invalidation request, this could result in some entries in the cache other than those that were the subject of the invalidation request being invalidated. It is worth noting, however, that even in these situations, the number of undesired invalidations should be small and thus, any performance penalty that occurs as a result of invalidating some unintended entries should also be small. Since the cache stores copies of data held in memory, the data can be re-retrieved if it is invalidated and then required at a later stage.

In some embodiments, the at least part of the physical addresses comprises most significant bits of the physical addresses. In this way, the entries in the correspondence table can refer to blocks of instructions rather than individual instructions.

In some embodiments, the at least part of the physical addresses refers to pages in the memory. For instance, if the page size in the data processing apparatus is 4 kB then bits 0-11 of the physical addresses may not be considered such that the entries of the correspondence table refer to pages.

In some embodiments, the cache comprises: operation storage circuitry to store the operations; and tag determination circuitry to store operation storage indexes of the operation storage circuitry where one of the operations corresponding to a received virtual address is located. Consequently by performing a lookup using the tag determination circuitry, it is possible to obtain an index of the operation storage circuitry where a particular operation is located.

In some embodiments, the operations are macro operations. Therefore, in such embodiments, the operations are not a result of directly decoding instructions, but could be as a result of decoding instructions into operations and then degenerating the operations into macro-operations, which may be performed by the execution units, with potentially multiple macro-operations being generated for multiple execution units. In some embodiments, the macro-operations are further degenerated into micro-operations, which are performed by the execution units. In some embodiments, execution units may operate on micro-operations and/or macro-operations and/or operations.

In some embodiments, the data processing apparatus comprises: fetch circuitry to fetch the instructions from the physical addresses in the memory; decode circuitry to receive the instructions and to decode the instructions to produce the operations; and fill circuitry to insert the physical addresses into the correspondence table circuitry, wherein the cache is adapted to store the operations in association with the correspondence table indexes where the physical addresses are located in the correspondence table circuitry. The fetch circuitry and the decode circuitry may collectively make up part of a pipeline. By storing the physical addresses in the correspondence table circuitry and by storing indexes of the correspondence table circuitry (i.e. where the physical addresses are stored) in association with the operations, it is possible to locate the operations corresponding with a particular physical address in a cache. This can be achieved even if the cache is indexed using virtual addresses (e.g. even if the cache provides an association between virtual addresses and corresponding operations of instructions stored at those virtual addresses).

There are a number of ways in which the correspondence table storage circuitry can be filled and in which the process of filling the correspondence table can be used to provide a mapping between the physical addresses in the correspondence table and the operations produced by instructions stored at those physical addresses.

In some embodiments, the physical addresses are provided to the fill circuitry by the fetch circuitry; and the fill circuitry inserts the physical addresses in the correspondence table circuitry at the correspondence table indexes. A correspondence table index therefore provides an index (e.g. a position number) in the correspondence table at which a particular physical address is stored.

In some embodiments, the fill circuitry returns the correspondence table indexes at which the physical addresses are inserted in the correspondence table circuitry; and the correspondence table indexes are passed by the fetch circuitry to the decode circuitry to insert the correspondence table indexes into the cache. In such embodiments, the correspondence table indexes are therefore passed along the pipeline, together with the virtual address (e.g. program counter value) of the instruction in question. Once the instruction has been decoded, the resulting operations can then be stored in association with the program counter value (e.g. virtual address) of the instruction and in association with the correspondence table index.

In some other embodiments, the data processing apparatus comprises fetch queue circuitry to store the virtual addresses of the instructions in memory at fetch queue indexes, wherein the fetch queue indexes are provided by the fetch circuitry, together with the physical addresses, to the fill circuitry; the fill circuitry causes the correspondence table indexes to be stored in the fetch queue circuitry in association with the virtual addresses; the fetch queue indexes are passed by the fetch circuitry to the cache circuitry; and the cache circuitry retrieves the physical addresses and the correspondence table indexes using the fetch queue indexes, to insert the correspondence table indexes into the cache. The fetch queue provides virtual addresses (program counter values) of instructions that are to be fetched. Each virtual address in the fetch queue is passed to the fetch circuitry, together with an index (e.g. position) of the fetch queue circuitry where that virtual address is located. In these embodiments, rather than merely providing the physical address to the fill circuitry, the fill circuitry is also provided with the fetch queue index. The fill circuitry then inserts the physical address into the correspondence table (as previously described) and the index at which that insertion takes place is then stored in association with the virtual address at the provided fetch queue index. The fetch queue therefore stores virtual addresses (e.g. program counter values) in association with indexes of the correspondence table circuitry where the equivalent physical address is located. Meanwhile, the fetch circuitry passes the fetch queue indexes to the cache circuitry (via the decode circuitry in some embodiments) and the cache circuitry retrieves the correspondence table index and the program counter value from the fetch queue circuitry using the fetch queue index. The cache can then be populated with the operations in association with the program counter/virtual address and the correspondence table index where the equivalent physical address is stored. Since the program counter value is not passed along by the fetch circuitry to the decode circuitry and then to the cache circuitry, and instead only an index of the fetch queue is passed along, the amount of data required to travel through the pipeline can be reduced. The amount of circuitry required is therefore reduced and the consequent power consumption is also lowered as compared to a situation in which the program counter value is passed through the pipeline.

In some embodiments, the incoming invalidation request is a snoop invalidation request received from another data processing apparatus. A snoop invalidation request can be made by another data processing apparatus in response to data being modified at the other data processing apparatus. In order to maintain coherency it is not possible for multiple versions of the same data to be stored. Thus, other versions of the data that are not being modified are invalidated and an invalidation request is used to cause those versions to be invalidated (e.g. deleted).

In some embodiments, the data processing apparatus comprises: instruction modification circuitry to perform a modification of old instructions in the memory; and in response to the modification, the data processing apparatus issues an outgoing invalidation request to another data processing apparatus, wherein the outgoing invalidation request references physical addresses at which the old instructions are located in the memory. Modification of instructions can take place in, for instance, Just In Time (JIT) compilation. In these situations, since an instruction in the instruction cache can be overwritten with a revised version of that instruction, it is necessary for other copies of that instruction (that might be located elsewhere) to be invalidated. This can be achieved by issuing an outgoing invalidation request that references a physical address where the old instruction is located. The outgoing invalidation request can then be sent to other locations where the instruction could be found, such as other data processing apparatuses that contain caches.

Particular embodiments will now be described with reference to the figures.

Figure 1:
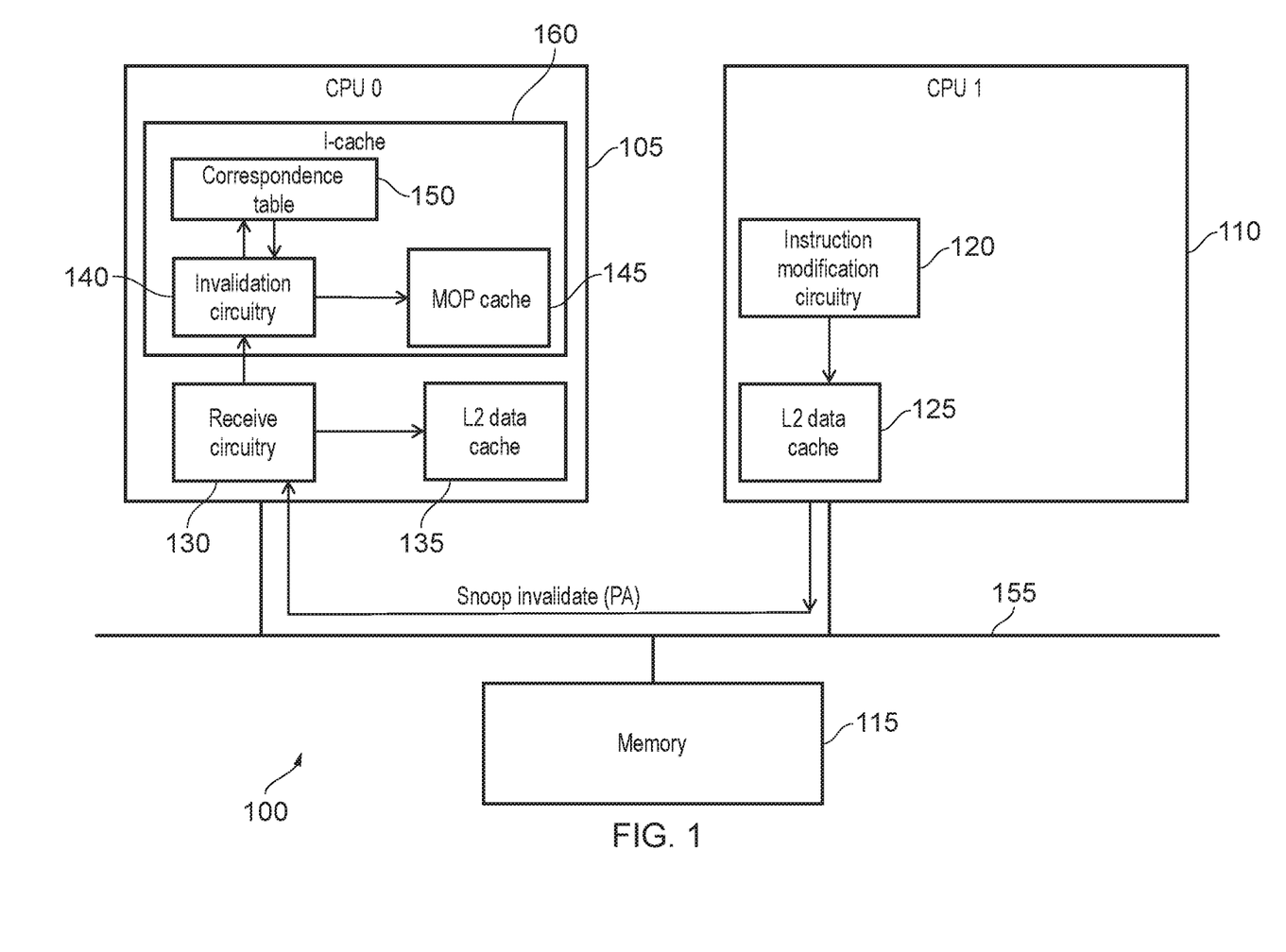
FIG. 1 schematically illustrates a system comprising two data processing apparatuses in accordance with some embodiments.

FIG. 1 schematically illustrates a system 100 including a first data processing apparatus 105, a second data processing apparatus 110, and a memory 115, which are connected via a bus 155. In this example, the second data processing apparatus 110 uses instruction modification circuitry 120 to modify operations corresponding to an instruction held within a level two data cache 125 of the second data processing apparatus 110. As a consequence of this modification, the operations corresponding to the instruction, which may be held in other caches of other data processing apparatuses in the system 100 such as the first data processing apparatus 105, must be invalidated. This invalidation ensures that multiple different versions of operations relating to the same instruction are not held within the system 100, which would cause uncertainty as to which version was correct. Accordingly, the second data processing apparatus 110 issues a snoop invalidation request, which is transmitted to the first data processing apparatus 105. The snoop invalidation request contains the Physical Address (PA) of the instruction for which modification has been performed.

The snoop invalidation request is received by receive circuitry 130 of the first data processing apparatus 105. If the first data processing apparatus 105 includes a data cache such as a level two data cache 135, then it may be possible to use the physical address to directly invalidate any copies of the instruction (or its operations) held within the level two data cache 135. In this example, the first data processing apparatus includes a macro operation (MOP) cache 145, which is indexed using virtual addresses. The MOP cache 145 forms part of an instruction cache 160 and stores the macro operations that are produced as a consequence of decoding instructions that are fetched from memory 115. Since the MOP cache 145 is indexed using virtual addresses, the physical address received in the invalidation request cannot be directly used to look up the corresponding entries. In these embodiments, the receive circuitry 130 therefore sends the physical address to invalidation circuitry 140 of the instruction cache 160. By consulting a correspondence table (PACT) 150, the invalidation circuitry 140 is able to determine the locations of entries in the MOP cache 145 that relate to the instruction being referenced in the snoop invalidation request.

Consequently, even though the MOP cache 145 is indexed using virtual addresses, it can still respond to invalidation requests received from other data processing apparatuses 110, where the reference in the snoop invalidation request is a physical address. Such a system can therefore take advantage of virtually indexed caches while also being useable within a coherent system.

Figure 2:
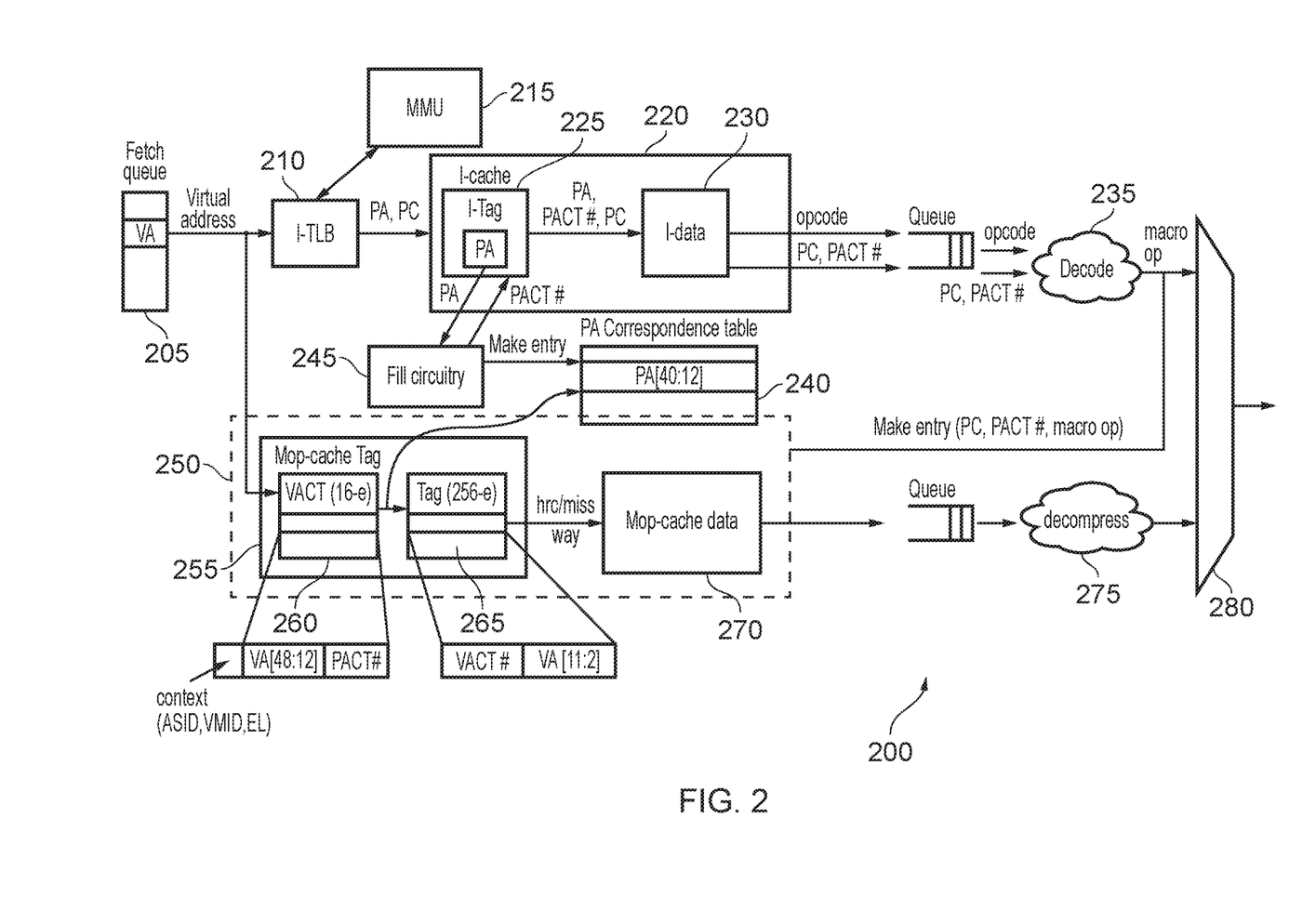
FIG. 2 illustrates a data processing apparatus in accordance with some embodiments.

FIG. 2 schematically illustrates an example of one of the data processing apparatuses 200. In the data processing apparatus 200, a fetch queue 205 lists a series of virtual addresses (VA) or program counter values at which instructions to be fetched are located. From here, there are two different paths that can be taken by the virtual addresses that are output from the fetch queue 205. In a first path, the virtual address is used by a translation look-aside buffer (TLB) 210 to translate the virtual address to a physical address. The TLB 210 acquires this information using a memory management unit (MMU) 215. The corresponding physical address provided by the TLB 210 and the program counter value (e.g. the virtual address) are provided to an instruction cache 220 containing instructions that have been fetched from memory. In this embodiment, the TLB is tagged using a virtual address, together with an execution context including an address space identifier (ASID), a virtual machine identifier (VMID), and an exception level/privilege level (EL). Here, an instruction tag circuit 225 uses the physical address to reference a location in an instruction data buffer 230. This produces an opcode of a fetched instruction. The opcode is provided to decode circuitry 235 via a queue. The decode circuitry 235 produces one or more macro operations. These macro operations can then be cached in a MOP cache 250, in order to save the need for decoding to have to be performed again.

In the second path that can be taken from the fetch queue 205, the virtual address is used to index into a macro operation cache tag circuit 255 of a MOP cache 250. If a hit occurs, this provides a reference into macro operation cache data buffer 270 where the corresponding macro operations are stored. The macro operations are then provided to a decompressor 275 via a queue. The second path therefore reduces the extent to which decoding is required and makes it possible for the macro-operations relating to an instruction to be retrieved more quickly.

Regardless of which of the two paths is taken, either the decode circuitry 235 or the decompress circuitry 275 provide their output to a multiplexer 280. The output of the multiplexer may then be provided to, for instance, rename circuitry or further stages of a pipeline.

Note that in this example, the macro operation cache tag 255 is made up of two individual circuits. The first, a virtual address correspondence table (VACT) 260 associates an execution context including an address space identifier (ASID), a virtual machine identifier (VMID), and an exception level/privilege level (EL), with upper bits of a virtual address ([48:12]). The entries of the VACT therefore contain data that corresponds with the tags used in the TLB. Entries of this table are referenced by a tag circuit 265 which also provide lower bits of a virtual address ([11:2]). This use of two separate tables 260, 265 recognises that there is a great deal of redundancy in virtual addresses. In particular, the most significant bits of virtual addresses are least likely to change and are more likely to be the same across a number of addresses that are accessed in a short space of time. Consequently, only a small number of entries (e.g. 16 in this example) are provided in the VACT 260, which represents the upper bits of the virtual address, while many more (e.g. 256 in this example) entries are provided in the tag circuit 265.

As previously explained, the data processing apparatus 200 in these examples includes a correspondence table (PACT) 240 to provide an indication of physical addresses that have recently been accessed. These are used for the purposes of invalidating the appropriate operations in response to invalidation requests. In particular, in this example, fill circuitry 245 is provided with a physical address from the instruction tag circuitry 225. The fill circuitry 245 then inserts bits of the physical address in to the correspondence table (PACT) 240. The fill circuitry 245 then provides an index in the correspondence table (PACT) 240 where the entry was made. This index is provided along with the program counter value (virtual address) to the decode circuitry 235. When the decode circuitry 235 provides the macro operations to the macro operation cache 250, to create a new entry, the macro operation is provided together with the program counter value (virtual address) and the index of the correspondence table (PACT) 240. The program counter value is used to populate the VACT 260 and the tag circuitry 265 (the bits being split between each of these two circuits 260, 265 as previously discussed). Meanwhile, the index of the correspondence table (PACT) 240 is provided along with the upper bits of the program counter/ virtual address in the VACT 260.

In this way, when a physical address relating to an instruction/operation(s) is received, the correspondence table (PACT) 240 can be searched. If an entry matching the physical address is found, then the index of that entry can be searched for in the VACT 260. Relevant entries of the MOP cache 250 can thereby be located and invalidated where necessary, even though the invalidation request references a physical address and the MOP cache 250 references a virtual address.

Figure 3:
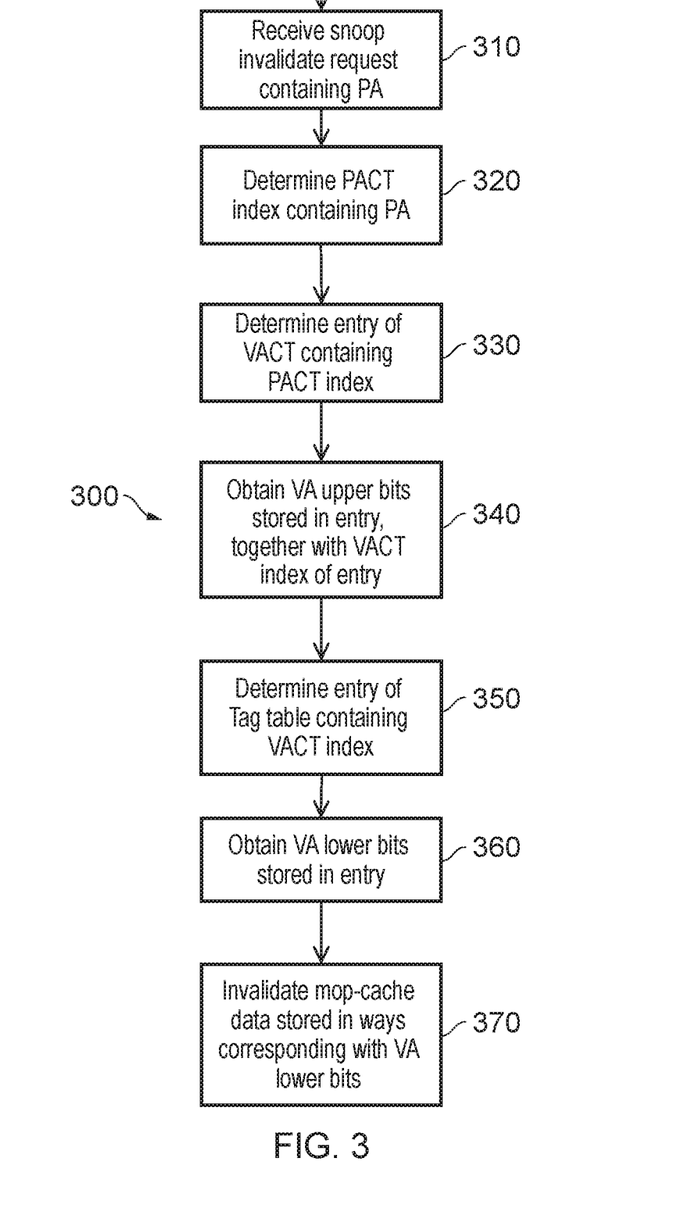
FIG. 3 illustrates a flowchart that shows a method of handling invalidation requests in accordance with some embodiments.

FIG. 3 illustrates a flow chart 300 that shows a process of responding to a snoop invalidation request using the circuitry illustrated with respect to FIG. 2, for example. At a step 310, the snoop invalidation request is received by, for instance, receive circuitry 130. At a step 320, an index of the correspondence table (PACT) 240 at which the physical address is listed is determined. The correspondence table (PACT) 240 may be fully associative such that each entry of the PACT table can be searched simultaneously. In this example, the correspondence table (PACT) 240 only lists upper bits of the physical address. In particular, each of the addresses in the correspondence table (PACT) 240 refers to a page in the memory (each page representing 4 kB of memory). A search of the correspondence table (PACT) 240 therefore only considers the same number of upper bits of the physical address. For instance, if the snoop invalidation request contains a full physical address having a length of 40 bits, then only bits 12 to 40 are used to search the correspondence table (PACT) 240 (since the correspondence table (PACT) 240 does not store bits 0-11). If no match is found, then there is no invalidation to be carried out. Alternatively, if a match is to be found, then at step 330, the index of the correspondence table (PACT) 240 that matches is determined. At a step 340, the VACT 260 is searched for entries containing the index of the correspondence table (PACT) 240 that was retrieved. The entry of the VACT 260 containing such an index is then determined. The upper bits of the virtual address stored in that entry are then determined at step 340. Using the index of this entry, at step 350, a search is made of the tag table 265 for any entry containing that index. This in turn provides the lower bits of the virtual address. The lower and upper bits are then combined in order to provide an index into the MOP cache data circuit 270. Any data stored at the relevant index is then invalidated.

For example, consider the situation in which a physical address PA[40:2] is received in an invalidation request. In this example, all entries of the correspondence table (PACT) 240 are searched for PA[40:12]. A match is found at an index 7. The VACT 260 is then searched for entries having a PACT index of 7. One entry is located at an index 12, which has a PACT index of 7 (as required) and lists upper bits of a virtual address VA[48:12]. The tag index 265 is then searched for entries having a VACT index of 12. Again, one entry is found, which provides lower bits of the virtual address VA[11:2] (in practice, since the page size here is 4 kB, the lower bits of the physical address received in the request— PA[11:2] will be the same as VA[11:2]. The two sets of bits are then combined to form (most) of a virtual address—VA [48:2]. This is then used to identify an entry of the mop-cache data 270 which is to be invalidated. Note that since an instruction is considered to occupy four bytes of memory, the lower two bits of the virtual address VA ([1:0]) are not needed.

Figure 4:
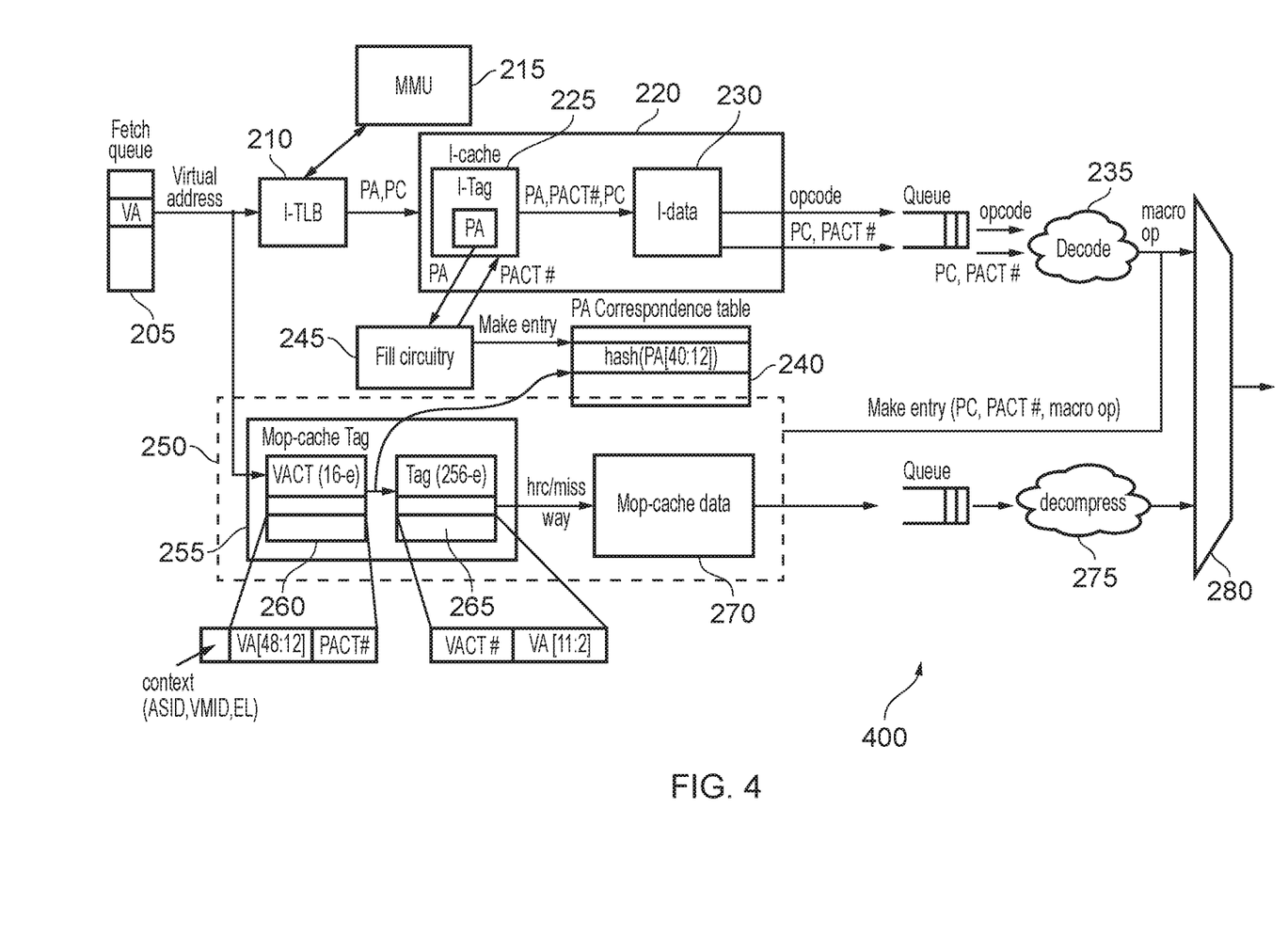
FIG. 4 illustrates a data processing apparatus in accordance with some embodiments.

FIG. 4 illustrates an alternative embodiment in which the data processing apparatus 400 uses the correspondence table (PACT) 240 to store hashes of the physical addresses or partial physical addresses. In this way, the size of the correspondence table (PACT) 240 can be reduced. The data processing apparatus 400 otherwise works in a similar manner to the apparatus 200 illustrated in FIG. 2. Note that since hashes of physical addresses are stored in the correspondence table (PACT) 240 it is possible that as a result of an incoming snoop invalidation request, a different entry of the MOP cache 250 that was intended could be invalidated as a result of that different entry of the MOP cache 250 resolving to the same hash value. It is expected that this situation will arise rarely and be performance penalty associated with occasionally invalidating a small number of additional entries of the MOP cache 250 (as opposed to invalidating all entries of the MOP cache 250) would be small.

Figure 5:
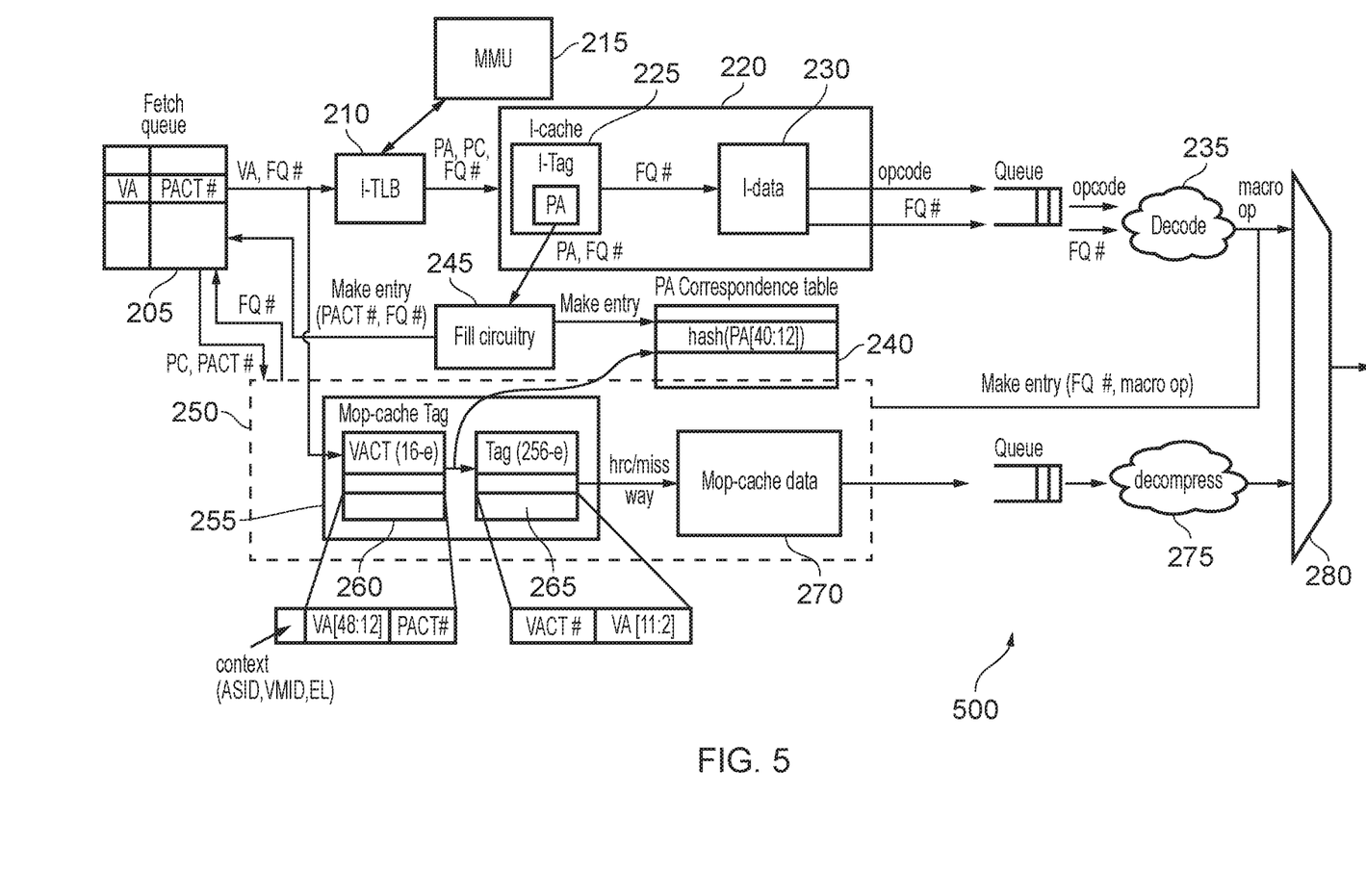
FIG. 5 illustrates a data processing apparatus in accordance with some embodiments.

FIG. 5 illustrates a data processing apparatus 500 in accordance with some embodiments. In these embodiments, as well as providing the virtual address, the fetch queue 205 provides an index of the fetch queue at which the virtual address currently being fetched is located. This is provided to the TLB 210 and passed from there to the instruction cache 220. Here, the tag circuitry 225 provides the physical address and the fetch queue index number to the fill circuitry 245. Again, the fill circuitry 245 inserts an entry into the correspondence table (PACT) 240. Additionally, the fill circuitry 245, rather than returning the index of the correspondence table (PACT) 240 to the tag circuitry 225, inserts the index of the correspondence table (PACT) 240 at the specified index of the fetch queue 205. Consequently, rather than providing the correspondence table index to the tag circuitry 225, it is instead stored in the corresponding entry of the fetch queue 205. The tag circuitry 225 also provides the fetch queue index to the instruction data buffer 230, which provides the fetch queue index to the decode circuitry 235 along with the opcode. The decode circuitry 235 provides the fetch queue index to the MOP cache circuitry 250 when making a new entry. Here, the MOP cache circuitry 250 uses the fetch queue index to access the specified entry of the fetch queue 205 to provide the corresponding virtual address/program counter value, and the correspondence table (PACT) index. These are then stored in the MOP cache tag circuitry 255 as previously described.

In this way, the amount of data transmitted from the instruction cache through to the decode circuitry and from the decode circuitry to the MOP cache 250 is significantly reduced. In particular, rather than providing the program counter value and the correspondence table (PACT) index through the pipeline, this data is stored at an index of the fetch queue and the index at which the data is stored is passed through the pipeline. The number of bits being transmitted is therefore significantly reduced. Once the fetch queue index is provided to the MOP cache 250 a lookup can be provided using the fetch queue 205 to retrieve the data that is necessary for populating the MOP cache 250.

Figure 6:
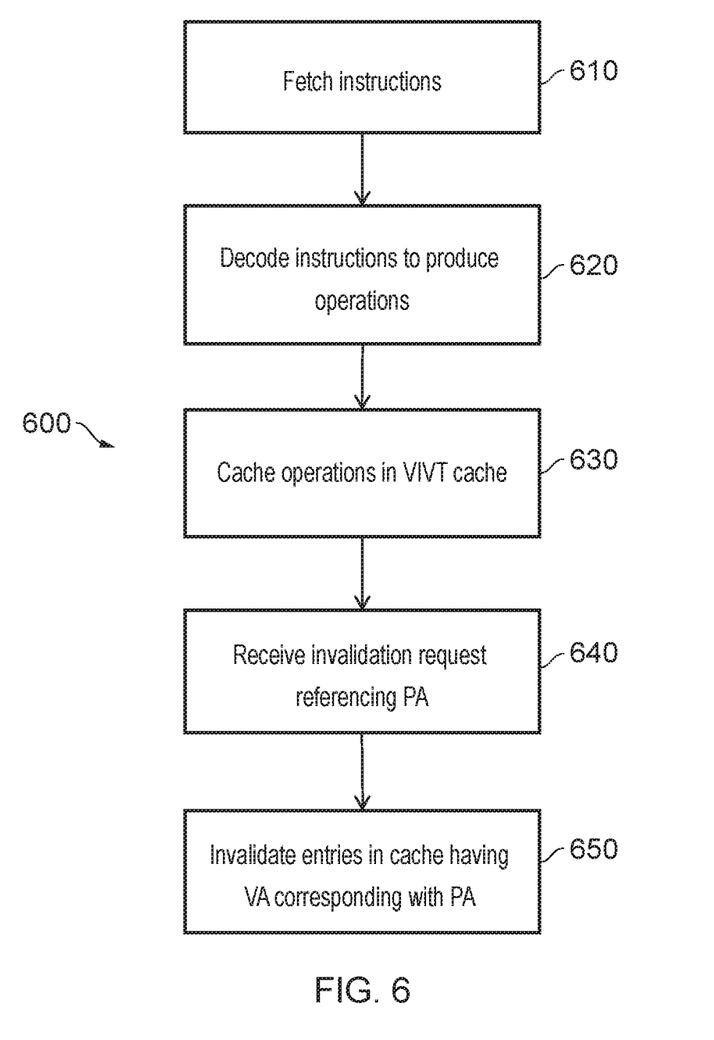
FIG. 6 illustrates a flowchart that shows a method of data processing in accordance with some embodiments.

FIG. 6 illustrates a flow chart 600 that shows a method of data processing in accordance with some embodiments. At a step 610, instructions are fetched. At a step 620, the instructions are decoded in order to produce operations. At a step 630, the operations are cached in a VIVT cache such as the MOP cache 250. Such a cache is indexed using virtual addresses. At a step 640, an invalidation request is received, which references a particular physical address. At a step 650, entries of the cache that have a virtual address that corresponds with the physical address received with the invalidation request are then invalidated. This can be achieved, for instance, by means of a correspondence table (PACT) 240 that is used to provide a correspondence between the physical address and a virtual address. This virtual address can then be used to look up relevant operations in the MOP cache 250 and so to determine which entries of the MOP cache 250 should be invalidated at a consequence of the invalidation request.

Accordingly via the above, it can be appreciated that it is possible to gain the advantages of using a virtually indexed MOP cache 250, which obviates the need for virtual address translation while still enabling consistency to take place in respect of invalidation requests (such as snoop invalidation requests) as may be received from other data processing apparatuses in a system.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
   a cache to store operations produced by decoding instructions fetched from memory, wherein the cache is indexed by virtual addresses of the instructions in the memory;
   receiving circuitry to receive an incoming invalidation request, wherein the incoming invalidation request references a physical address in the memory; and
   invalidation circuitry to invalidate entries in the cache where the virtual address corresponds with the physical address;
   correspondence table storage circuitry to store indications of physical addresses of the instructions fetched from the memory;
   fetch circuitry to fetch the instructions from the physical addresses in the memory;
   decode circuitry to receive the instructions and to decode the instructions to produce the operations;
   fill circuitry to insert the physical addresses into the correspondence table circuitry;
   wherein the cache is adapted to store the operations in association with the correspondence table indexes where the physical addresses are located in the correspondence table circuitry;
   fetch queue circuitry to store the virtual addresses of the instructions in memory at fetch queue indexes, wherein
   the fetch circuitry is adapted to provide the fetch queue indexes together with the physical addresses to the fill circuitry;
   the fill circuitry is adapted to cause the correspondence table indexes to be stored in the fetch queue circuitry in association with the virtual addresses;
   the fetch circuitry is adapted to pass the fetch queue indexes to the cache; and
   the cache is adapted to retrieve the physical addresses and the correspondence table indexes using the fetch queue indexes and to insert the correspondence table indexes into the cache.

2. The data processing apparatus according to claim 1, wherein in response to the incoming invalidation request, the invalidation circuitry is adapted to determine a correspondence table index of the correspondence table storage circuitry that corresponds with the physical address referenced in the incoming invalidation request.

3. The data processing apparatus according to claim 2, wherein
the cache is adapted to store one of the operations in association with one of the correspondence table indexes of the correspondence table storage circuitry containing one of the indications of the physical addresses of one of the instructions that decodes to the one of the operations.

4. The data processing apparatus according to claim 1, wherein
the indications of the physical addresses stored in the correspondence table storage circuitry comprise hashes of at least part of the physical addresses.

5. The data processing apparatus according to claim 4, wherein
the at least part of the physical addresses comprises most significant bits of the physical addresses.

6. The data processing apparatus according to claim 5, wherein
the at least part of the physical addresses refers to pages in the memory.

7. The data processing apparatus according to claim 1, wherein
the cache comprises:
operation storage circuitry to store the operations; and
tag determination circuitry to store operation storage indexes of the operation storage circuitry where one of the operations corresponding to a received virtual address is located.

8. The data processing apparatus according to claim 1, wherein
the operations are macro-operations.

9. The data processing apparatus according to claim 1, wherein
the physical addresses are provided to the fill circuitry by the fetch circuitry; and
the fill circuitry inserts the physical addresses in the correspondence table circuitry at the correspondence table indexes.

10. The data processing apparatus according to claim 9, wherein
the fill circuitry returns the correspondence table indexes at which the physical addresses are inserted in the correspondence table circuitry; and
the correspondence table indexes are passed by the fetch circuitry to the decode circuitry to insert the correspondence table indexes into the cache.

11. The data processing apparatus according to claim 1, wherein
the incoming invalidation request is a snoop invalidation request received from another data processing apparatus.

12. The data processing apparatus according to claim 1, comprising:
instruction modification circuitry to perform a modification of old instructions in the memory; and
in response to the modification, the data processing apparatus issues an outgoing invalidation request to another data processing apparatus, wherein the outgoing invalidation request references physical addresses at which the old instructions are located in the memory.

13. A data processing method comprising:
decoding instructions fetched from memory to produce operations;
storing the operations in a cache that is indexed by virtual addresses of the instructions;
receiving an incoming invalidation request that references a physical address in the memory;
invalidating entries in the cache where a virtual address corresponds with the physical address;
storing indications of physical addresses of the instructions fetched from the memory in a correspondence table;
fetching the instructions from the physical addresses in the memory;
receiving the instructions and decoding the instructions to produce the operations;
inserting the physical addresses into the correspondence table;
storing the operations in association with the correspondence table indexes where the physical addresses are located in the correspondence table circuitry;
storing, in the fetch queue, the virtual addresses of the instructions in memory at fetch queue indexes;
providing the fetch queue indexes together with the physical addresses to fill circuitry;
causing the correspondence table indexes to be stored in the fetch queue circuitry in association with the virtual addresses;
passing the fetch queue indexes to the cache;
retrieving the physical addresses and the correspondence table indexes using the fetch queue indexes; and
inserting the correspondence table indexes into the cache.

14. A data processing apparatus comprising:
means for decoding instructions fetched from memory to produce operations;
means for storing the operations in a cache that is indexed by virtual addresses of the instructions;
means for receiving an incoming invalidation request that references a physical address in the memory;
means for invalidating entries in the cache where a virtual address corresponds with the physical address;
means for storing indications of physical addresses of the instructions fetched from memory in a correspondence table;
means for fetching instructions from the physical addresses in the memory;
means for receiving and decoding the instructions to produce the operations;
means for inserting the physical addresses into the correspondence table;
wherein the means for storing the operations in the cache is adapted to store the operations in association with the correspondence table indexes where the physical addresses are located in the correspondence table;
means for storing the virtual addresses of the instructions in memory at fetch queue indexes in a fetch queue, wherein
the means for fetching instructions is adapted to provide the fetch queue indexes together with the physical addresses to the means for inserting the physical addresses into the correspondence table;
the means for inserting the physical addresses into the correspondence table is adapted to cause the correspondence table indexes to be stored in the fetch queue in association with the virtual addresses;
the means for fetching instructions is adapted to pass the fetch queue indexes to the cache; and the means for storing the operations in a cache is adapted to retrieve the physical addresses and the correspondence table indexes using the fetch queue indexes and to insert the correspondence table indexes into the cache.

\* \* \* \* \*